United States Patent [19]

Plude, Jr.

[11] Patent Number: 6,014,221

[45] Date of Patent: Jan. 11, 2000

[54] METHOD AND APPARATUS FOR COLOR MATCHING

[75] Inventor: Howard H. Plude, Jr., Avon, Conn.

[73] Assignee: Gerber Scientific Products, Inc., Manchester, Conn.

[21] Appl. No.: 08/867,550

[22] Filed: Jun. 2, 1997

[51] Int. Cl.[7] ........................................................ G01J 3/46
[52] U.S. Cl. ............................................................ 356/402
[58] Field of Search ..................................... 356/333–334, 356/402, 411, 326, 328; 250/226; 364/536; 382/165, 162; 358/503, 514; 347/61–62, 176, 178; 399/215

[56] References Cited

U.S. PATENT DOCUMENTS

| | | |
|---|---|---|
| 3,778,541 | 12/1973 | Bowker . |
| 3,878,384 | 4/1975 | Bowker . |
| 3,935,436 | 1/1976 | Holschlag et al. . |
| 4,654,794 | 3/1987 | O'Brien . |

*Primary Examiner*—K. P. Hantis
*Attorney, Agent, or Firm*—McCormick, Paulding & Huber LLP

[57] ABSTRACT

In a process for choosing a color most closely replicating an object's actual color, a computer processor programmed with a database of sets of digital color data and the corresponding formulas for producing those colors using one or more thermal transfer foils, or vinyl sheet materials, is provided. The process includes sensing an object's color and producing a set of digital color data representing the sensed color. The set of digital data representing the sensed color is then supplied to the computer processor which is operated to compare the supplied set of digital color data to the digital color data stored in the database. The computer processor then outputs, to a display, a listing of the closest color matches found in the database, to the sensed color. The user then selects the color and formula defined by the digital information stored in the database corresponding to a color producible using thermal transfer foils or vinyl sheet materials, to that most closely matching the sensed color.

16 Claims, 1 Drawing Sheet

METHOD AND APPARATUS FOR COLOR MATCHING

FIELD OF THE INVENTION

The present invention relates generally to color printing using thermal transfer foils, and deals more particularly with a method and apparatus for matching a desired color to the closest color producible by thermally printing or overprinting one or a number of available thermal transfer foil colors, and/or choosing the best color match when the image will be produced with color vinyl substrates.

BACKGROUND OF THE INVENTION

Often, printed images strive to reproduce the appearance of actual objects, such as, for example an automobile. An aspect of this reproduction is the replication of the object's colors. One known technique of printing and reproducing the color of an object is to employ a color-ink-jet printer which prints a series of side-by-side colored dots which appear to blend together when viewed at an appropriate distance, thereby simulating the desired color. However, one of the problems with this method of color printing, is that when a person views the image while in close proximity to it, the dot patterns are readily discernible causing the image to lack the crispness of line of the original object.

In an attempt to address this problem, thermal printers have been used to produce solid, continuous colors thereby eliminating the aforementioned problems associated with ink-jet printing. In a typical thermal printing process, donor or thermal transfer foils that consist of a thin material carrying a layer of pigment dispersed in a wax or wax-resin vehicle are used as the printing medium. The thermal transfer foils are loaded into the thermal printer which acts to transfer the pigment onto a receiving surface by applying heat and pressure to selected areas of the foil. While this produced a solid continuous layer of color, the user was limited to the number of available individual foil colors. Accordingly, it was often difficult to obtain a close match to the actual color of the object on the image being printed. In an effort to expand the range of colors printable using thermal transfer foils, a process known as thermal overprinting was employed wherein layers of pigment are transferred form the thermal transfer foils, one-on-top-of-the-other, onto a thermally printable receiving surface. This created a greatly expanded palette of available colors and shades.

However, the above-described overprinting process while significantly increasing the number of available colors, created other problems for the user of the thermal transfer foils. First, each overprinted color had a specific formula associated with it, that is, a certain number of thermal transfer foils were used to apply layers of pigment in a specific order. Therefore, the user not only had to match the color, he/she also had to know the formula or the specific print order of the foils for producing that color and have the appropriate thermal transfer foils on-hand. Moreover, the overprinting process can produce a large number of resulting variations in the shades of colors which made it difficult to arrive at the color or shade most closely approximating that of the object whose image was to be reproduced.

Based on the foregoing, it is the general object of the present invention to provide a method whereby the closest color matches to an object's color, and the corresponding formulas for the color matches can be readily determined by the user.

It is a more specific object of the present invention to provide a method whereby the aforementioned closest matches are derived from the inventory of thermal transfer foils on-hand at a user's facility.

SUMMARY OF THE INVENTION

The present invention meets these and other objects by providing, in one aspect, a process for choosing a color, that most closely replicates an object's actual color, from a database of colors producible using thermal transfer foils and/or colored vinyl substrates. In this process a computer processor programmed with a database of sets of digital color data and the respective formulas for colors reproducible from a single thermal transfer foil, or from a combination of overprinted thermal transfer foils, is provided. The computer processor includes an interface through which sets of digital color data can be input. The computer processor is also programmed to output a listing of the colors stored in the aforementioned database and the formulas corresponding to those colors that most closely match the color of the object as evidenced by the input set of digital color data.

A digitizing means for sensing an object's color and converting the sensed color to digital color data is also provided. Preferably, the digitizing means consists of a colorimeter or color spectrophotometer that can be coupled to the interface on the computer processor. The digitizing means is operated to sense the color of the object, convert the sensed color to the aforementioned set of digital color data, and transfer the data to the computer processor through the interface. Alternatively, the user may also enter the spectral or digital color data, measured by a remote digitizing means, corresponding to the color for which a match is desired via a keyboard or other manual input means coupled to the processor.

Subsequent to the transfer of the digital color data, the computer processor is operated to compare the input or transferred digital color data to the sets of color data stored in the database. The computer processor then generates a listing of the colors and their associated formulas which most closely approximate the sensed color. This listing is output to a display means where the user can select the desired color from a chart typically illustrating the top 10 (in descending order) best color matches.

In a related aspect, the above-described computer processor is further programmed with a user's current inventory of thermal transfer foils. When the listing of matched colors and their associated formulas is output from the computer processor to the display means, if the user does not have the necessary thermal transfer foils in inventory, a message will appear on the display means stating that the user's current inventory does not include one or more of the thermal transfer foils required to produce the color corresponding to the best match. The user then has the option to choose another color or order the proper thermal transfer foils.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DETAILED DESCRIPTION OF THE PREFERRED EMBODIMENTS

Figure 1:
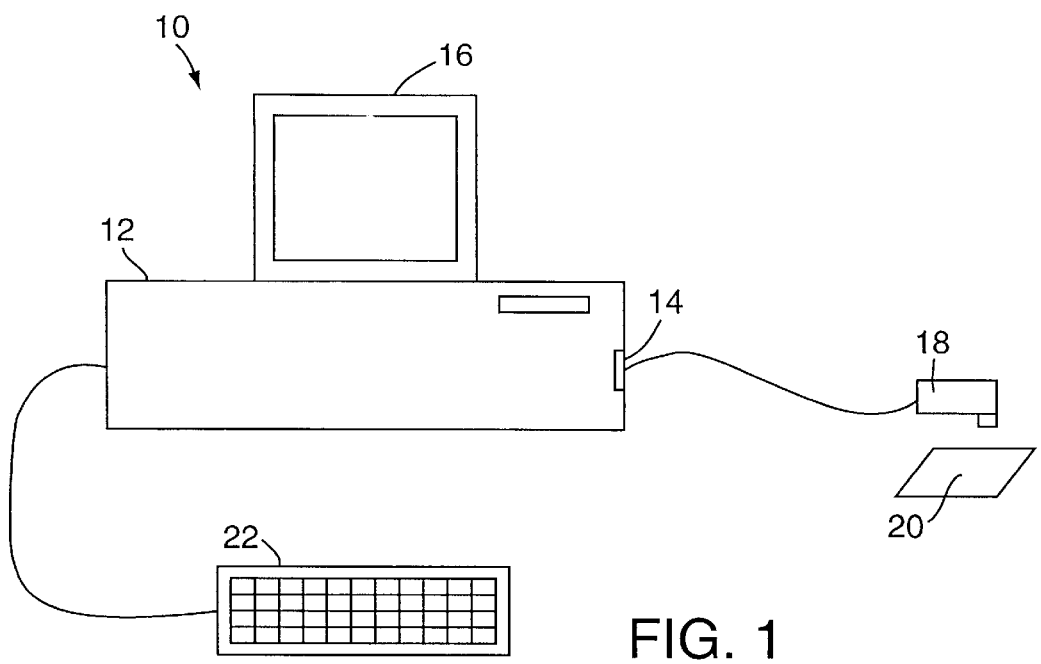
FIG. 1 is a simplified schematic of the apparatus for practicing the method of the present invention.

Turning to the drawings and first referring to FIG. 1, an apparatus used in the process of the present invention there shown and generally designated as 10 comprises a computer processor 12 including an interface 14 through which sets of digital color data can be input into the computer processor. A display means 16 is coupled to the computer processor 12 for displaying information output from the processor. A digitizing means 18 for sensing an object's color and converting the sensed color to digital color data is removably coupled to the interface 14.

The computer processor 12 is programmed with a database of sets of digital color data and the formulas for colors reproducible using a single thermal transfer foil or a combination of overprinted thermal transfer foils. In addition, the computer processor can also be programmed with sets of digital color data corresponding to colored vinyl substrates. A thermal transfer foil consists of a thin material carrying a layer of pigment dispersed in a wax or wax-resin vehicle. The foil is loaded into a thermal printer which acts to transfer the pigment onto a thermally printable receiving surface by applying heat and pressure to selected areas of the foil. The overprinting process is one where successive layers of pigment are transferred from the thermal transfer foils one-on-top-of-the-other to produce different colors or shades of colors. The overprinting method is shown and described in U.S. patent application Ser. No. 08/735,923, entitled "METHOD AND APPARATUS FOR THERMAL COLOR PRINTING" to Gerber, D. J. filed on Oct. 24, 1996 and assigned to the assignee of the present invention. The patent application is hereby incorporated by reference as part of the present disclosure.

Still referring to FIG. 1, the digitizing means 18 is removably coupled to the interface 14 and is used to sense the color of an object 20. The sensed color is then converted by the digitizing means 18 to digital color data. Preferably the digitizing means includes colorimeter or color spectrophotometer type and can be operated either while directly coupled to the interface 14 on the computer processor 12, or remotely, storing the set of digital data corresponding to the sensed color until such time as the digitizing means can be coupled to the interface. A digitizing means including a colorimeter type found to be particularly useful in practicing the process of the present invention is the TECHKON® Colorimeter CP 300 manufactured by TECHKON Elektronik GmbH, this device must be coupled to the interface 14 of the computer processor 12 in order to be used to sense a color. A digitizing means including a color spectrophotometer found to be particularly useful in practicing the process of the present invention is the ColorTec-PCM™ Manufactured by ColorTec Associates, Inc., this device can be used while coupled to the interface 14, or it can be operated remotely to sense a color on a particular object and convert the sensed color to a set of digital data. The device then stores the data in memory until such time as it can be coupled to the interface 14 on the computer processor 12. Alternatively, the user may also enter a set of digital data corresponding to one or more sensed colors via means for issuing command signals 22 coupled to the computer processor. In the illustrated embodiment, the means for entering command signals 22 is a keyboard, however the invention is not limited in this regard, other means such as a touch-screen or numeric keypad may be used without departing from the broader aspects of the present invention. While the digitizing means have been described above as including a colorimeter or a color spectrophotometer, the invention is not limited in this regard as any color sensing device, known to those skilled in the art, that provides a set of digital color data, may be substituted without departing from the broader aspects of the present invention.

Figure 2:
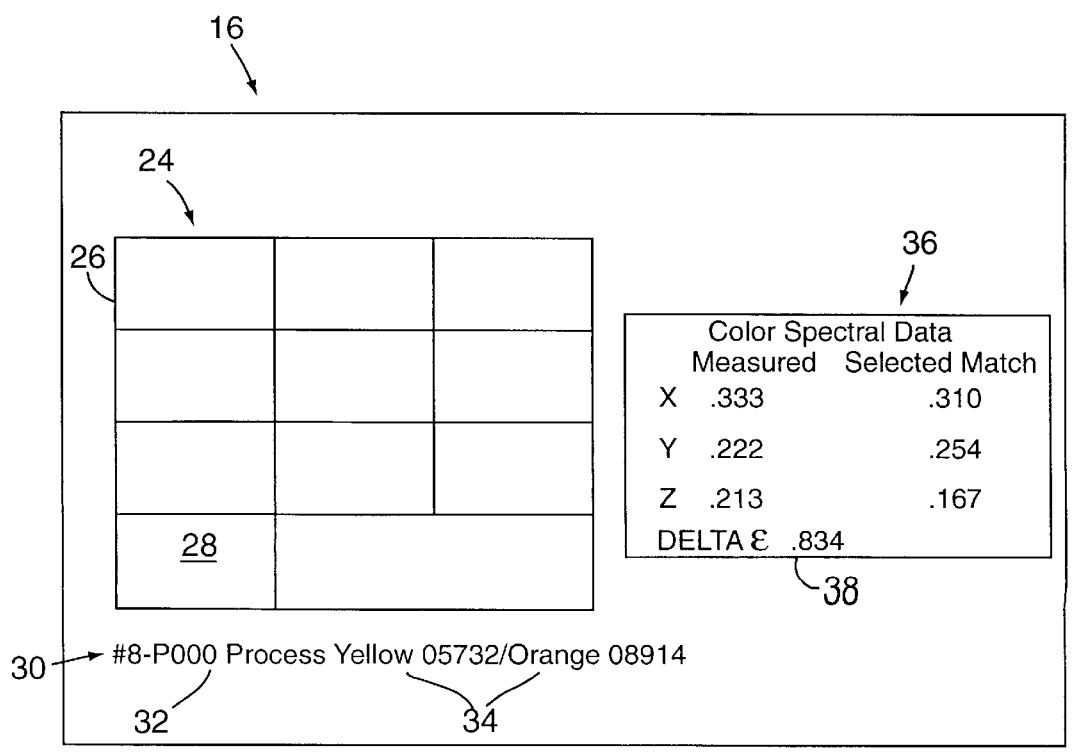
FIG. 2 is a front view of a display screen illustrating the color matches retrieved from the database stored in the computer processor.

Referring to FIGS. 1 and 2, after the set of digital color data sensed by one of the above-described digitizing means 18 has been entered into the computer processor 12, the display means 16 displays a number, typically ten, of color matches 24. The display of color matches 24 is formatted such that the closest producible color match 26 is first in the display, and the tenth closest color match 28 is last in the display. As mentioned above, the user can selectively choose whether the display of color matches 24 should correspond to colors producible using a single thermal transfer foil, two or more overprinted thermal transfer foils, or a colored vinyl substrate color. The data outputted by the computer processor 12 to the display means 16 can also include the formula 30 for producing the particular color. Depending on the choice made by the user, the formula 30 can consist of either the single thermal transfer foil color, or the combination, and the order of application by which the thermal transfer foils are overprinted to produce the desired color. In the illustrated embodiment, the formula 30, includes a code number 32 identifying the particular color selected, as well as the combination 34 of the individual thermal transfer foils needed to produce the selected color. In addition to the foregoing, the data output by the computer processor 12 to the display means 16 includes data-box 36 which lists the color spectral data values, illustrated as X, Y, and Z for the "measured" color and the "selected match". In addition, a quantity identified as "Delta E" 38 is also displayed and corresponds to the error or deviation of the selected color to the sensed color.

Based on selections made by the user, the computer-processor 12 can also output a set of colors complementary to the color match chosen such that the user can quickly arrive at a coordinated color scheme for a given work operation. The computer processor 12 can also be programmed with a database of particular paint colors and those achievable by mixing paint colors, such that when a combination of paint and thermal printing are going to be used on a particular work operation, the computer processor can output both the formulas for the selected colors producible via the thermal printing process described above, and the formulas for any paints of a complimentary color that would also be used.

Referring back to FIG. 1, in operation, the digitizing means 18, is used to sense an object's color. The sensed color is converted by the digitizing means 18 to a set of digital color data. Depending on the type of digitizing means used, the set, or sets if more than one color is sensed, of digital color data is either immediately input into the computer processor 12 through the interface 14, or it is stored in the memory of the digitizing means. If stored in memory, the set(s) of digital color data can be input to the computer processor by either coupling the digitizing means 18 to the interface 14, or manually inputting the data via the keyboard 22. Once the set of digital color data is input into the computer processor 12, the processor is operated and a listing of the best matches of the colors stored in the database is output to a display means 16. Referring to FIG. 2, the output colors 24 and their corresponding formulas 30 can then be selected by the user.

While preferred embodiments have been shown and described, various modifications and substitutions may be made without departing from the spirit and scope of the present invention. Accordingly, it is to be understood that the present invention has been described by way of example and not by limitation.

What is claimed is:

1. A process for choosing a color, that most closely replicates an object's actual color, from a database storing digital information in terms of sets of digital color data, a plurality of individual colors producible from a given supply of thermal transfer foils of different colors, said process comprising the steps of:

identifying a plurality of thermal transfer foils of different colors;

providing a database storing digital information in terms of digital color data corresponding to a plurality of colors producible from said identified foils;

providing a computer processor having access to said database;

sensing said object's color and producing a set of digital color data representing said sensed color and supplying said set of color data to said computer processor;

operating said computer processor to compare said set of digital color data representing said sensed color to said sets of digital color data defined by the digital information stored in said database;

generating a listing of sets of color data defined by the digital information stored in said database that most closely match said object's sensed color;

outputting said listing to a display means; and selecting from said listing a color data formula defined by the digital information stored in said database as a best match to said sensed color.

2. A process for choosing a color as defined by claim 1, wherein:

said computer processor is further programmed with a user's current inventory of thermal transfer foils; and wherein said step of generating said listing includes, generating said listing corresponding to colors printable from said user's current inventory of thermal transfer foils.

3. A process for choosing a color as defined by claim 1 wherein said step of sensing said objects color is accomplished using a digitizing means.

4. A process for choosing a color as defined by claim 3 wherein said digitizing means includes a colorimeter.

5. A process for choosing a color as defined by claim 3 wherein said digitizing means includes a color spectrophotometer.

6. A process for choosing a color as defined by claim 3, wherein said digitizing means is coupled to an interface on said computer processor.

7. A process for choosing a color as defined by claim 3, wherein said digitizing means is operated remotely from said computer processor, and said set of color data is stored in said digitizing means' memory until such time as it can be supplied to said computer processor.

8. A process for choosing a color as defined by claim 7 wherein said digitizing means' memory can retain a plurality of sets of digital color data.

9. A process for choosing a color as defined by claim 1, wherein said computer processor includes means for issuing command signals; and wherein said step of supplying said set of digital color data to said computer processor includes, manually inputting said set of digital color data into said computer processor using said means for issuing command signals.

10. A process for choosing a color as defined by claim 1, wherein:

said computer processor further includes means for issuing command signals; and wherein said process further includes the step of:

issuing commands to said computer processor instructing said processor to generate said listing of said colors and said formulas stored in said database that most closely match said object's color by choosing the single thermal transfer foil color most closely approximating said sensed color.

11. A process for choosing a color as defined by claim 1, wherein:

said database includes sets of digital color data corresponding to the colors of available vinyl sheet material; and wherein said process includes the step of:

issuing commands to said computer processor instructing said processor to generate a listing of vinyl sheet material colors most closely approximating said sensed color of said object.

12. A process for choosing a color as defined by claim 1, wherein said database further comprises sets of digital color data corresponding to a plurality of different paint colors, and wherein said process further includes the step of:

generating a list of paint colors complimentary to said listing of colors producible using said thermal transfer foils that most closely match said sensed color, such that said user can arrive at a coordinated color scheme for a particular work operation where both painted images and images produced using thermal transfer foils will be employed.

13. An apparatus for choosing colors from a database of colors producible using thermal transfer foils that most closely replicate the actual colors of an object, comprising:

a computer processor including means for inputting, receiving and issuing command signals, an interface whereby sets of digital color data can be input into said computer processor, said computer processor being programmed with a database of sets of digital color data representing colors producible using thermal transfer foils and the formulas for printing said colors, said computer processor being further programmed to output a listing of the closest color matches from said database, to a sensed color;

digitizing means for sensing an object's color and generating said digital color data;

display means for displaying said closest color matches output by said computer processor in response to said input digital color data.

14. An apparatus for choosing colors as defined by claim 13, wherein said digitizing means includes a colorimeter.

15. An apparatus for choosing colors are defined by claim 13, wherein said digitizing means includes a color spectrophotometer.

16. An apparatus for choosing colors as defined by claim 13, wherein said computer processor is further programmed with a database of sets of digital color data corresponding to the colors of vinyl sheet materials.

* * * * *